United States Patent [19]

Raftis et al.

[11] Patent Number: 4,523,738
[45] Date of Patent: Jun. 18, 1985

[54] DEFORMABLE SLEEVE FOR A PINCH VALVE

[75] Inventors: Spiros G. Raftis, Pittsburgh, Pa.; George Merritt, Uniontown, Ohio

[73] Assignee: Red Valve Co. Inc., Carnegie, Pa.

[21] Appl. No.: 624,973

[22] Filed: Jun. 27, 1984

Related U.S. Application Data

[63] Continuation-in-part of Ser. No. 354,939, Mar. 5, 1982, abandoned.

[51] Int. Cl.³ .............................................. F16L 55/14
[52] U.S. Cl. .......................................... 251/4; 251/7; 251/8; 138/109
[58] Field of Search ..................... 251/4–10; 138/109

[56] References Cited

U.S. PATENT DOCUMENTS

| | | | |
|---|---|---|---|
| 2,716,575 | 8/1955 | Vickers | 251/5 |
| 4,172,580 | 10/1979 | Raftis et al. | 251/8 |
| 4,196,464 | 4/1980 | Russell | 138/109 |
| 4,234,019 | 11/1980 | Horner et al. | 138/109 |
| 4,325,413 | 4/1982 | Lenhart et al. | 138/109 |
| 4,412,554 | 11/1983 | Chow | 251/5 |

*Primary Examiner*—Martin P. Schwadron
*Assistant Examiner*—Sheri Novack
*Attorney, Agent, or Firm*—Kirschstein, Kirschstein, Ottinger & Israel

[57] ABSTRACT

A deformable sleeve for a pinch valve includes an inner tubular body of elastically deformable material which is provided with flanges at its axial ends, and a mesh element having a tubular portion which surrounds the tubular body between the flanges and prevents the same from bulging out under the influence of internal pressure. The mesh element further has anchoring portions which are anchored to the flanges. The anchoring portions can either be connected to the faces of the flanges which face one another, or embedded in the material of the flanges, either directly, or by being connected, such as clamped between or welded to, anchoring rings which are embedded in the material of the flanges. The anchoring rings may be polygonal, especially rectangular or L-shaped in radial section, or circular or similarly curved in radial section. The mesh element may advantageously be of stainless steel mesh. It may be vulcanized to the elastically deformable material, or a web or sheet of synthetic plastic material acting as a separator may be interposed between the mesh element and the tubular body to prevent damage to the latter.

13 Claims, 11 Drawing Figures

DEFORMABLE SLEEVE FOR A PINCH VALVE

CROSS-REFERENCE TO RELATED APPLICATION

This application is a continuation-in-part of our previous U.S. patent application Ser. No. 354,939 filed Mar. 5, 1982, now abandoned.

BACKGROUND OF THE INVENTION

The present invention relates to deformable sleeves in general, and more particularly to a deformable sleeve for use as the flow-controlling element in a pinch valve. Still more particularly, the present invention relates to a pinch valve including the deformable sleeve.

Various constructions of pinch valves are already known. Usually, a pinch valve includes two pinching elements, such as pinching bars, which are mounted on a support for movement toward and away from one another. In many instances, it is sufficient when only one of the pinching elements is movable, while the other is stationarily mounted on the support, which may be either stationary, or movable, relative to the pipeline in which the pinch valve is incorporated. A deformable sleeve of an elastically deformable material, such as gum rubber, Neoprene, Butyl, Buna N, Hypalon, Viton, urethane, EPT (nordel), silicone, or food grade rubber, is situated between and interconnects and communicates the ends of two sections of the pipeline in which the pinch valve is interposed. The sleeve extends across the space between the pinching elements, so that it is squeezed by the latter as they move relative to one another in direction toward each other, whereby the flow-through cross-sectional area of, and thus the amount of the flowable medium passing between the sections of the pipeline through, the sleeve is reduced. Conventional pinch valves have been traditionally used for controlling the flow of media which are conveyed at relatively low pressures, such as solids in suspension, that is slurries or air-propelled particulate materials, abrasive materials such as metal ores, asbestos fibers, sand, sugar, coal, wood chips, pulp, paper stock, plastic pellets, sewage, talc, cement, fly ash, and various chemicals and foodstuffs. The reason for this limitation as to the type of materials conveyed was that the elastomeric sleeve of the conventional pinch valve constructions was unable to withstand high internal pressures needed for conveying other types of materials, especially over substantial distances.

However, the requirement for maintaining the internal pressure in the sleeve as low above the atmospheric pressure as possible resulted in other kinds of problems, especially in the problem of loss of elasticity of the sleeve after an extended period of dwell thereof in the closed position. This is attributable to the gradual creep of the elastomeric material of the sleeve, so that the material loses its tendency to return to its original shape corresponding to the open position of the pinch valve and the maximum flow-through cross-sectional area of the sleeve. To avoid this drawback, it has been proposed in the U.S. Pat. No. 4,172,580 to mount wire loops on the pinching elements, these wire loops embracing or being partially embedded in the sleeve and being operative for exerting oppositely oriented forces on the sleeve at opposing locations situated between the pinching elements, during the movement of such pinching elements apart. As the distance between such locations is reduced due to the application of such forces thereto, the sleeve is gradually restored to its original cylindrically tubular configuration corresponding to the open position of the sleeve, in response to the movement of the pinching elements away from one another.

A considerable advantage of a pinch valve is not only its simple construction, but also the absence therefrom of any interfaces between relatively movable elements which would have to be sealed in order to prevent leakage of the medium present in the pipeline therethrough to the exterior of the valve, as they have to be in other types of valves. Thus, it would be advantageous if pinch valves could be used for controlling the flow of high-pressure media as well. However, as already alluded to before, the conventional sleeves are incapable of withstanding such high pressures. Experience has shown that, because of its elasticity, the sleeve of a conventional pinch valve will bulge out or assume a balloon-shaped configuration, which strains the material of the sleeve and may lead to its rupture. Yet, it was heretofore believed to be impossible to so reinforce the sleeve as to prevent its outward bulging, since it was believed that this would automatically prevent the inward deformation of the sleeve which is to occur during the pinching operation of the pinch valve.

SUMMARY OF THE INVENTION

Accordingly, it is a general object of the present invention to avoid the disadvantages of the prior art.

More particularly, it is an object of the invention to develop a deformable sleeve for use in pinch valves which does not possess the drawbacks of the conventional deformable sleeves of this type.

It is still another object of the present invention to so construct the deformable sleeve as to be usable even at relatively high internal pressures.

A further object of the present invention is so to design the deformable sleeve as to be simple in construction, inexpensive to manufacture, and reliable in operation nevertheless.

It is a concomitant object of the invention to devise a pinch valve which is capable of being used in pipelines for conveying media at relatively high pressures.

In pursuance of these objects and others which will become apparent hereafter, one feature of the present invention resides in a deformable sleeve for use in a pinch valve, this sleeve comprising a tubular body of elastically yieldable material having two end portions, two end flanges each integral with one of the end portions and extending radially outwardly therefrom, and a mesh element having a tubular portion surrounding the tubular body between the end portions and anchoring portions extending from the tubular portion at the flanges and anchored to the latter.

A particular advantage of this construction is that the mesh element prevents the tubular body from bulging outwardly under the influence of internal pressure of the flowable medium being conveyed through the interior of the sleeve, while offering only acceptable resistance to the inward deformation of the tubular body during the movement of the pinching elements of the pinch valve in which the sleeve is being used toward one another. On the other hand, once the pinching elements have moved apart, the internal pressure in the interior of the sleeve will cause not only the tubular body but also the tubular portion of the mesh element to reassume its original substantially circularly annular configuration.

While it is known in the field of manufacturing flexible hoses to provide embedded or external mesh reinforcement of the elastomeric material of the hose, this approach has never been previously successfully attempted for constructing deformable sleeves of pinch valves. One possible reason for this is the experience with mesh-reinforced hoses, especially such reinforced by a wire mesh sleeve, which showed that such reinforced hoses are extremely difficult to squeeze or pinch and that the deformation of the wire mesh is permanent once the squeezing or pinching has resulted in deformation. Now, quite surprisingly, it has been discovered that these previously feared phenomena do not occur in the sleeve of a pinch valve, provided that the anchoring portions of the mesh element are properly anchored to the flanges of the tubular body.

Thus, in accordance with a further aspect of the present invention, there is provided separate means for anchoring the anchoring portions of the mesh element to the flanges. Such anchoring means preferably includes at least one annular anchoring element at each of the flanges and rigidly attached thereto, and means for connecting the anchoring portions to the anchoring elements.

So, for instance, the anchoring element can be attached to the respective flange by being embedded therein. Then the means for connecting the anchoring portions to the anchoring element may include welded connections between the respective anchoring portions of the mesh element and the associated annular anchoring elements.

In a particularly simple and easily manufacturable construction according to the present invention, the anchoring element is an anchoring disc of an annular configuration which is substantially rectangular in radial section. Then, the respective flange may have a plurality of through openings therethrough, and the annular disc may either be fully situated radially inwardly of the openings of the flange, or extend in the radial direction from inwardly to outwardly of the openings. In the latter instance, the annular disc has through apertures therein which are in registry with the openings of the flange.

However, the anchoring element in accordance with the present invention may as well be substantially L-shaped or otherwise polygonal, or substantially circular, oval, elliptical or the like, in radial section.

The anchoring portion of the mesh element does not have to be connected to the anchoring element by being welded thereto; rather, in accordance with a further facet of the present invention, the connecting means may include an additional annular anchoring element juxtaposed with the first-mentioned anchoring element at the respective flange and clamping the anchoring portion of the mesh element between itself and the first-mentioned anchoring element. Then, it is also advantageous when these anchoring elements are both embedded in the respective flange.

A particularly durable construction of the sleeve, which can be operated at very high internal pressures, is obtained when the mesh element is made of a metallic wire mesh, especially of stainless steel wire mesh. It is particularly advantageous, especially when the mesh element is made of metallic wire mesh, when a separating element is interposed between the exterior of the tubular body and the interior of the mesh element. Such a separating element advantageously is of a synthetic plastic material, especially Nylon. The advantage of using such a separating element is that it prevents the material of the elastomeric body from flowing into the spaces between the wires of the mesh under the influence of the internal pressure. However, at least for certain uses of the pinch valve incorporating the sleeve element according to the present invention, the sleeve may have the mesh element vulcanized to the tubular body.

The present invention is also concerned with a pinch valve which, according to the invention, includes a support; a deformable sleeve including a tubular body of elastically deformable material having two end portions, two end flanges each integral with one of the end portions and extending radially outwardly therefrom, and a mesh element having a tubular portion surrounding the tubular body between the end portions, and anchoring portions extending from the tubular portion at the flanges and anchored to the latter; and at least two pinching elements mounted on the support for movement relative to one another toward and away from each other and operative for pinching the tubular portion of the mesh element and, via the latter, also the tubular body during their relative movement toward each other.

The novel features which are considered as characteristic of the invention are set forth in particular in the appended claims; the improved deformable sleeve itself, as well as the pinch valve employing the same, both as to their construction and their mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
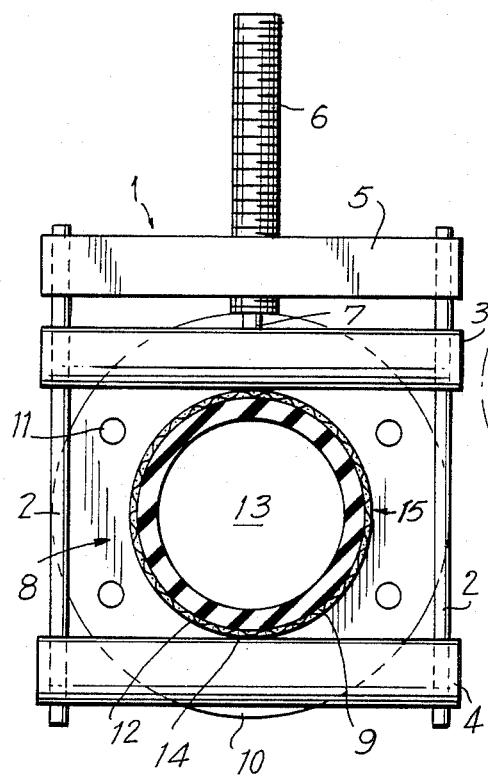
FIG. 1 is a cross-sectional view of a deformable sleeve according to the present invention as embodied in a pinch valve.

Referring now to the drawing in detail, and first to FIG. 1, it may be seen that the reference numeral 1 has been used therein to identify a pinch valve in its entirety. The pinch valve 1 includes a support 2 consisting of a plurality of support rods 2 which are parallel to one another and spaced apart from each other. Two bar-shaped pinching elements 3 and 4 are mounted on the support rods 2. The pinching element 4 is rigidly connected to the support rods 2 so as to interconnect the same and prevent displacement thereof relative to one another. On the other hand, the pinching element 3 is mounted on the support rods 2 for movement longitudinally of the latter toward and away from the pinching element 4. The rods 2 are further interconnected, at their ends remote from the pinching element 4, by a connecting bar 5 which also contributes to the stability of the support rods 2.

The connecting bar 5 has a centrally located internally threaded bore which receives a threaded actuating element 6 and meshes with the external threads thereof. The actuating element 6 has a central projection 7' which is connected to and acts on the movable pinching element 3.

A deformable sleeve 8 of an elastically yieldable material extends across the space between the pinching elements 3 and 4. The deformable element 8 has a tubular section 9 which passes between the pinching elements 3 and 4, and two flanges 7 (only one of which is shown in FIG. 1) which are arranged at the axial ends of the tubular section 9 outside of the trajectory of relative movement of the pinching elements 3 and 4 and which are integral with the tubular section 9. The illustrated flange 7 is shown to have a plurality of openings 11 which extend through the flange 7 in substantial parallelism with the axis of the sleeve 8 and which serve to connect the flange 7 to a section, or more particularly to a similar flange of such section, of a pipeline in which the pinch valve 1 is interposed. As also shown in FIG. 1, the tubular section 9 of the sleeve 8 includes an inner tubular body 12 which bounds an internal passage 13 for the flowable medium whose flow is to be controlled, and an outer tubular portion or sheath 14 which is a part of a tubular mesh element 15 that will be discussed in more detail later.

In operation, the pinch valve 1 is capable of controlling the flow-through cross-sectional area of the internal passage 13, and thus the rate of flow of the flowable medium through the latter and thus through the pipeline. This control is achieved by turning the actuating element 6 which, as mentioned above, has an external thread which engages the internal thread of the bore of the connecting bar 5. Thus, the threaded element 6 moves with respect to the connecting bar 5 and this movement is imparted to the movable pinching element 3 by the central projection 7'. When the actuating element 6 is rotated in such a sense that the movable pinching element 3 moves toward the stationary pinching element 4, the pinching elements 3 and 4 will exert opposite forces on the tubular section 9 directed toward the center of the latter, so that the shape of the tubular section 9 will change from substantially circular to oval. Since the circular cross section of the passage 13 permits the greatest flow of the flowable medium for a given inner circumference, any deviation from the circular cross section to an oval one will result in diminution of the flow-through cross-sectional area of the passage 13 and thus in a reduction in the rate of flow of the flowable medium through the passage 13. Of course, the more the pinching elements 3 and 4 move toward one another, the lesser will be the flow-through cross-sectional area of the passage 13 and eventually the flow through the passage 13 can be interrupted altogether. On the other hand, turning the actuating element 7' in the opposite direction after the pinching elements 3 and 4 have been caused to pinch the tubular section 9 of the sleeve 8 between themselves will result in releasing the tubular section 9, so that the internal pressure prevailing in the internal passage 13 will urge the tubular section 9 closer and closer to the original circular shape. As mentioned before, the elastically yieldable body 12 is surrounded by the tubular portion 14 of the mesh element 15 so that the latter presents a limit to the outward expansion of the body 12. Hence, the sleeve 8 of the present invention is particularly suited for use at high pressures of the medium present in the internal passage 13, because it can easily withstand such pressures without unduly bulging out or bursting.

To be able to withstand such pressures without becoming so deformed that it would lose its restraining or limiting function, the tubular portion 14 of the mesh element 15 must be securely anchored to the integral formation including the tubular body 12 and the flanges 7. Various possibilities of anchoring the mesh element 15 to the formation 12,7 will now be discussed in connection with the remaining Figures of the drawing. In each instance, the mesh element 15 has anchoring portions 16 which are being used to secure the tubular portion 14 to the flanges 7.

Figure 2:
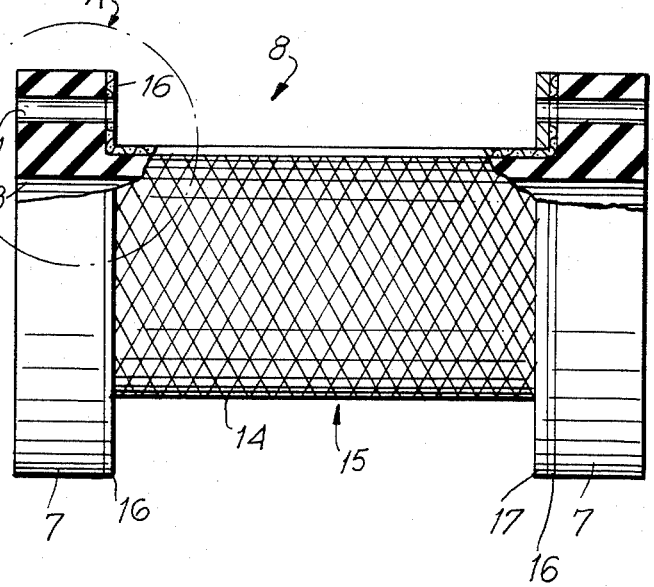
FIG. 2 is a partially axially sectioned side elevational view of the sleeve of FIG. 1.

In FIG. 2, on the left side, there is shown a construction in which the anchoring portion 16 overlies that face of the flange 7 which faces toward the other flange 7. The portion 16 may be held in position by the fasteners which pass through the holes 11. However, the anchoring portion 16 and/or the tubular portion 14 may be vulcanized to the underlying portions, that is, to the flange 7, and to the tubular body 12, respectively. An even more secure anchoring arrangement is shown in FIG. 2 on the right side, wherein the anchoring portion 16 is clamped between the flange 7 and an additional clamping ring 17 which is pressed against the flange 7 by the fasteners in the assembled condition.

Figure 3:
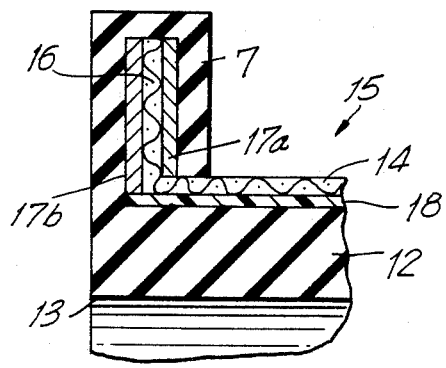
FIG. 3 is an axial sectional view of a modification of the anchoring arrangement for the mesh element of the sleeve corresponding to detail A of FIG. 2.

FIG. 3 shows a modified anchoring arrangement in which the anchoring portion 16 of the mesh element 15 extends substantially radially from the tubular portion 14 into the interior of the flange 7. In this construction, the flange 7 is not provided with any holes since it is connected to the associated section of the pipeline by connecting means which does not require the presence of such holes. The anchoring portion 16 is clamped between two clamping rings 17a and 17b both of which are embedded in the material of the flange 7. In this construction, the rings 17a and 17b extend almost all the way to the outer periphery of the flange, thus substantially reinforcing the same. FIG. 3 also shows that a web, a sheet, or a similar tubular formation 18 preferably of a synthetic plastic material, such as Nylon, may be interposed between the outer periphery of the tubular body 12 and the inner periphery of the tubular portion 14 of the mesh element 15. This formation 18 acts as a cushion or separator which prevents the wires or fibers of the mesh element 15 from digging into the material of the tubular body 12 when the latter is subjected to considerable internal pressure.

Figure 4:
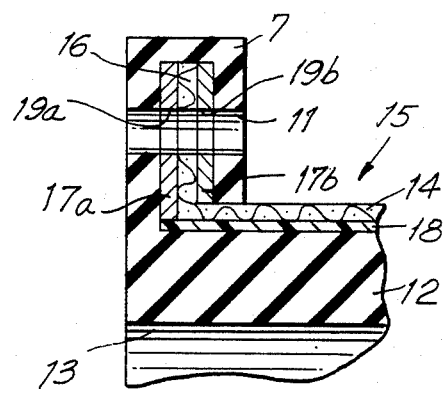
FIG. 4 is a view similar to FIG. 3 but of a further modification.
Figure 6:
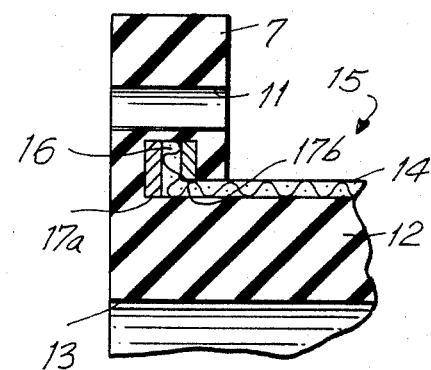
FIG. 6 is a view similar to FIG. 3 but of an additional modification.

FIG. 4 shows an arrangement similar in many respects to that shown in FIG. 3, except that the flange 7 is provided with the bores 11. In this construction, the rings 17a and 17b are provided with respective bores or apertures 19a and 19b which are in registry with the bores or holes 11 to form throughgoing openings therewith. In FIG. 6, a similar effect is achieved by letting the rings 17a and 17b terminate internally at a spacing from the holes 11 which are then formed in their entirety in the synthetic plastic material of the flange 7.

Figure 5:
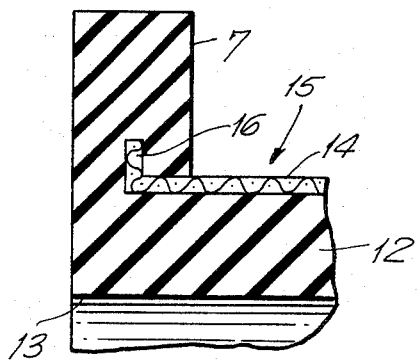
FIG. 5 is a view similar to FIG. 3 but of yet another modification.

In FIG. 5 the anchoring portion is simply constituted by an outwardly bent portion 16 of the mesh element 15, which is merely embedded in the material of the flange 7 without being clamped between or otherwise connected to any rings. This construction is especially simple and inexpensive, but it assures sufficient anchoring action at least for some uses of the sleeve 8, especially at pressures which are not extremely high.

Figure 7:
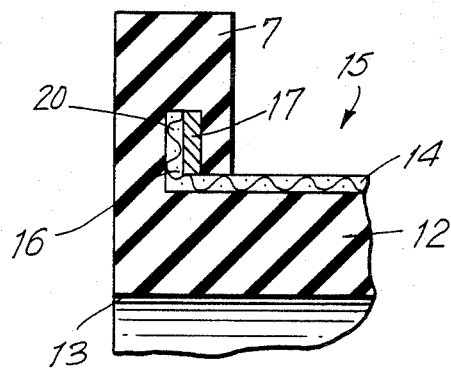
FIG. 7 is a view similar to FIG. 3 but of still another modification.
Figure 8:
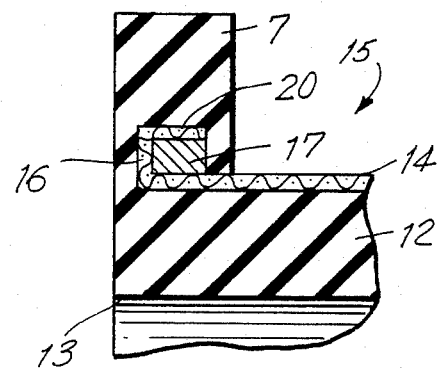
FIG. 8 is a view similar to FIG. 3 but of another modification.

For use at very high pressures, however, it is preferred to use the following anchoring arrangements in which the anchoring portion is welded to the respective ring. So, for instance, the anchoring element or ring 17 is substantially rectangular in cross section in FIGS. 7 and 8. In FIG. 7, the larger dimension of the rectangle extends in the radial direction, and the anchoring portion 16 is welded or connected by a welded connection 20 to that major surface of the ring 17 which faces toward the free end face of the flange 7. On the other hand, in FIG. 8 it is the smaller dimension of the rectangle which extends radially, and the welded connection 20 connects the anchoring portion 16 at least to that major surface of the ring 17 which faces radially outwardly.

Figure 9:
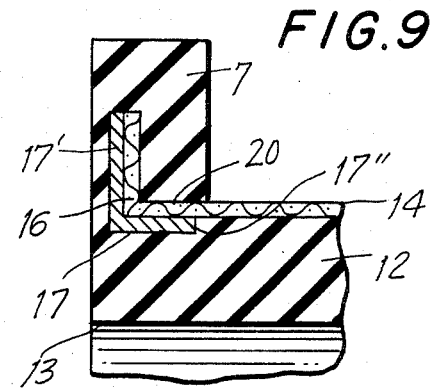
FIG. 9 is a view similar to FIG. 3 but of a still further modification.
Figure 10:
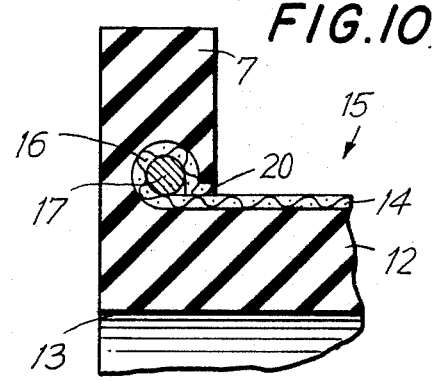
FIG. 10 is a view similar to FIG. 3 but showing another modification of the anchoring arrangement.

The anchoring arrangement which is depicted in FIG. 9 includes an anchoring element or ring 17 which is substantially L-shaped in radial section, having a leg 17' which extends substantially radially, and another leg 17" extending substantially axially. The welded connection 20 connects the anchoring portion 16 either to the outer circumferential surface of the leg 17", as shown, or to the inner circumferential surface of this leg 17", or even to the leg 17' if the anchoring portion 16 goes around the corner. Finally, the anchoring element or ring 17 of FIG. 10 is circular in radial section, and the anchoring portion 16 is wrapped around the same, closing upon itself and being connected by the welded connection to itself and/or to the periphery of the anchoring ring 17.

The mesh element 15 of the present invention is preferably a metallic wire mesh, preferably of stainless steel, which combines high strength with resilent flexibility and capability of being connected to the elastomeric material of the formation 12, 7 by vulcanization. However, high-strength synthetic plastic materials are also contemplated for the mesh element 15.

It will be understood that each of the elements described above, or two or more together, may also find a useful application in other types of arrangements differing from the type described above. So, for instance, the anchoring arrangements at both of the flanges 7 may be identical or mirror images of one another; however, any combination of the anchoring arrangements described herein is also possible and feasible. Generally speaking, the type of the anchoring arrangement will be selected in dependence on the conditions to which the sleeve 8 will be subjected when in use.

Figure 11:
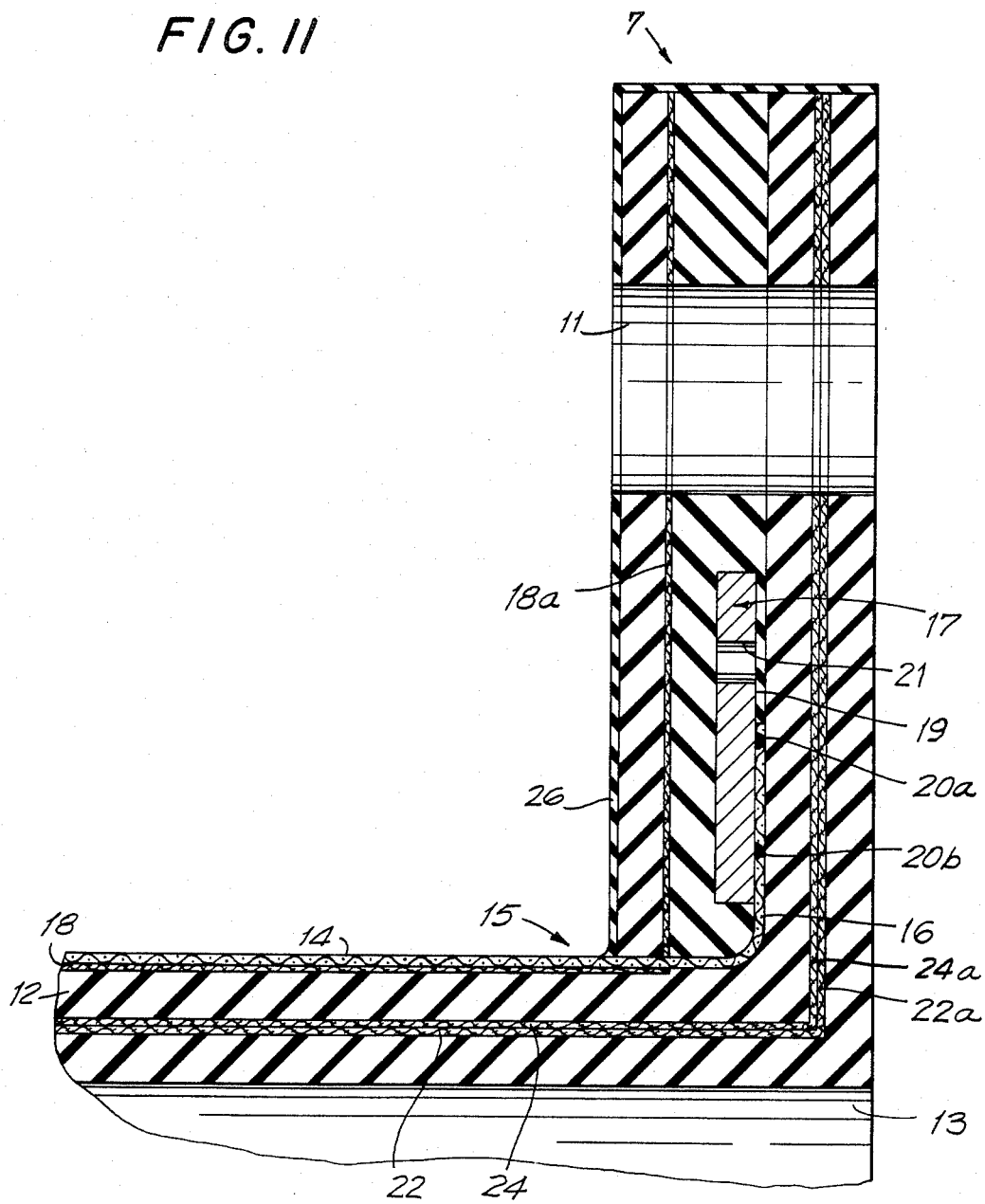
FIG. 11 is a view analogous to FIG. 3 but showing a final modification of the anchoring arrangement in a reverse orientation.

For use at very high pressures on the order of four hundred pounds per square inch, the anchoring arrangement of FIG. 11 is advantageously used. The tubular mesh element 15 includes the outer tubular braided sheath 14, and the tubular fabric formation 18. The element 15 bounds the inner tubular rubber body 12 of the sleeve 8 which bounds the internal passage 13.

The anchoring portion 16 of the mesh element 15 extends substantially radially from the sheath 14 into the interior of the flange 7 and is soldered to an anchoring surface 19 of the clamping ring 17 at weld points 20a, 20b. The ring 17 is formed with a bore 21 through which the surrounding rubber of the flange 7 may creep or flow into to increase the overall anchoring effect.

The fabric formation 18 has a radial extension 18a which extends substantially radially into the interior of the flange 7 to further improve the anchoring action.

A pair of juxtaposed fabric plies 22, 24, preferably of nylon, are positioned within the sleeve body 12, and each ply has a radial extension 22a, 24a which extends into the interior of the flange 7. The radial extensions 22a, 24a face the anchoring surface 19 of the ring 17, whereas the radial fabric extension 18a faces the opposite surface of the ring 17.

A cover 26, preferably of rubber, is placed about the flange 7 to still further increase the anchoring action.

By soldering the anchoring portion 16 of the mesh element 15 to the anchoring surface 19 of the clamping ring, the sheath 14 is under a reduced stress and is not prone to crack or fatigue during high pressure operation of the pinch valve.

While the invention has been illustrated and described as embodied in a deformable sleeve for use in high pressure pinch valves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the accompanying claims.

We claim:

1. A high-pressure-resistant pinch valve sleeve for use in a pinch valve through which flowable media at relatively high pressures are conveyed, comprising:
   (a) an elongated tubular body having opposite end portions, said tubular body having an elastically yieldable side wall which is radially inwardly deformable from an initial shape in response to the application of radially inwardly-directed external forces to its exterior during pinch valve operation, said side wall also being resiliently restorable to its initial shape upon removal of said external forces and in response to the conveyance of high-pressure media through the interior of the tubular body during pinch valve operation;
   (b) a pair of end flanges each having a plurality of openings therethrough, each flange being integral with one of said end portions of said tubular body and extending radially outwardly therefrom;
   (c) a mesh element having an elongated tubular sheath portion having opposite end portions, said tubular sheath portion being movable with and confining said tubular body between said end portions of the latter for preventing the tubular body from bulging outwardly under the influence of said high-pressure media while offering acceptable resistance to said external forces, said mesh element having a pair of anchoring portions at said opposite end portions of said tubular sheath portion, each anchoring portion having a major surface which extends at least in part radially outwardly from said tubular sheath portion; and (d) means for anchoring said anchoring portions to said end flanges, said anchoring means including an annular disc anchoring element at each of said end flanges and rigidly attached thereto and embedded therein, each anchoring element having a major surface which extends at least in part radially outwardly from said tubular sheath portion and which respectively lies in juxtaposition with said major surface of each anchoring portion, each anchoring element being fully situated radially inwardly of said openings of the respective flange, and means including a welded connection for connecting said major surface of each anchoring portion to said respectively juxtaposed major surface of each anchoring element.

2. A high-pressure-resistant pinch valve for conveying flowable media at relatively high pressures, comprising:

(a) a support;

(b) at least two pinching elements mounted on said support for movement relative to one another toward and away from each other;

(c) an elongated tubular body having opposite end portions, said tubular body having an elastically yieldable side wall located between said pinching elements, said side wall being radially inwardly deformable from an initial shape in response to the pinching movement of said pinching elements toward each other, said side wall also being resiliently restorable to its initial shape in response to the relative movement of said pinching elements away from each other and to the conveyance of high-pressure media through the interior of the tubular body;

(d) a pair of end flanges, each integral with one of said end portions of said tubular body and extending radially outwardly therefrom;

(e) a mesh element having an elongated tubular sheath portion having opposite end portions, said tubular sheath portion being movable with and confining said tubular body between said end portions of the latter for preventing the tubular body from bulging outwardly under the influence of said high-pressure media while offering acceptable resistance to the pinching movement, said mesh element having a pair of anchoring portions at said opposite end portions of said tubular sheath portion, each anchoring portion having a major surface which extends at least in part radially outwardly from said tubular sheath portion; and (f) means for anchoring said anchoring portions to said end flanges, said anchoring means including an annular anchoring element at each of said end flanges and rigidly attached thereto, each anchoring element having a major surface which extends at least in part radially outwardly from said tubular sheath portion and which respectively lies in juxtaposition with said major surface of each anchoring portion, said anchoring means further including a reinforcing ply extending at least in part in the radially outward direction and overlying said major surface of each anchoring element, and an auxiliary reinforcing ply extending at least in part in the radially outward direction and overlying an opposite major surface of each anchoring element, and means for connecting said major surface of each anchoring portion to said respectively juxtaposed major surface of each anchoring element.

3. A high-pressure-resistant pinch valve for conveying flowable media at relatively high pressures, comprising:

(a) a support;

(b) at least two pinching elements mounted on said support for movement relative to one another toward and away from each other;

(c) an elongated tubular body having opposite end portions, said tubular body having an elastically yieldable side wall located between said pinching elements, said side wall being radially inwardly deformable from an initial shape in response to the pinching movement of said pinching elements toward each other, said side wall also being resiliently restorable to its initial shape in response to the relative movement of said pinching elements away from each other and to the conveyance of high-pressure media through the interior of the tubular body;

(d) a pair of end flanges, each integral with one of said end portions of said tubular body and extending radially outwardly therefrom;

(e) a mesh element having an elongated tubular sheath portion having opposite end portions, said tubular sheath portion being movable with and confining said tubular body between said end portions of the latter for preventing the tubular body from bulging outwardly under the influence of said high-pressure media while offering acceptable resistance to the pinching movement, said mesh element having a pair of anchoring portions at said opposite end portions of said tubular sheath portion, each anchoring portion having a major surface which extends at least in part radially outwardly from said tubular sheath portion; and (f) means for anchoring said anchoring portions to said end flanges, said anchoring means including an annular anchoring element at each of said end flanges and rigidly attached thereto, each anchoring element having a major surface which extends at least in part radially outwardly from said tubular sheath portion and which respectively lies in juxtaposition with said major surface of each anchoring portion, each anchoring element having a bore through which adjacent material of the respective flange may enter to increase the anchoring action, and means for connecting said major surface of each anchoring portion to said respectively juxtaposed major surface of each anchoring element.

4. The sleeve as defined in claim 3, wherein each end flange has an outer free end face for connection to a pipeline in which the pinch valve is mounted, and wherein said major surface of each anchoring portion is located intermediate said respective major surface of each anchoring element and said respective outer free end face of each flange.

5. The sleeve as defined in claim 3, wherein each anchoring element is embedded in the respective flange.

6. The sleeve as defined in claim 5, wherein said connecting means includes a welded connection.

7. The sleeve as defined in claim 6, wherein each anchoring element is an annular disc.

8. The sleeve as defined in claim 7, wherein each flange has a plurality of openings therethrough.

9. The sleeve as defined in claim 3, wherein said mesh element is of a metallic wire mesh.

10. The sleeve as defined in claim 9; and further comprising a tubular separating element interposed between the exterior of said tubular body and the interior of said metallic mesh.

11. The sleeve as defined in claim 10, wherein said separating element is of a synthetic plastic material.

12. The sleeve as defined in claim 11, wherein said synthetic plastic material is nylon.

13. The sleeve as defined in claim 3, wherein said mesh element is vulcanized to said tubular body.

* * * * *